July 8, 1969
H. O. CORBETT ET AL
3,454,447
BAG-MAKING MACHINERY
Filed Aug. 5, 1964
Sheet 1 of 8
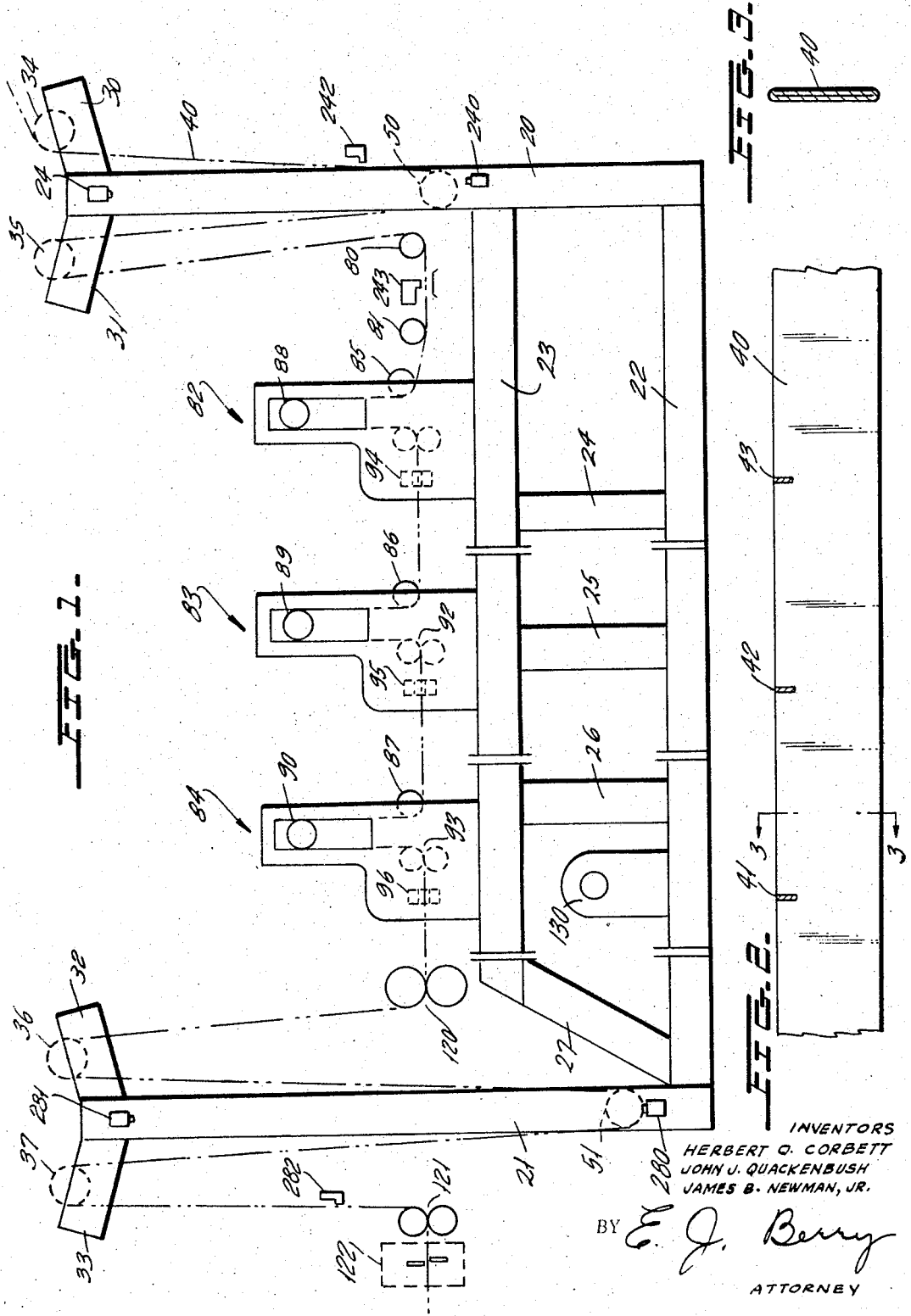
INVENTORS
HERBERT O. CORBETT
JOHN J. QUACKENBUSH
JAMES B. NEWMAN, JR.
BY E. J. Berry
ATTORNEY

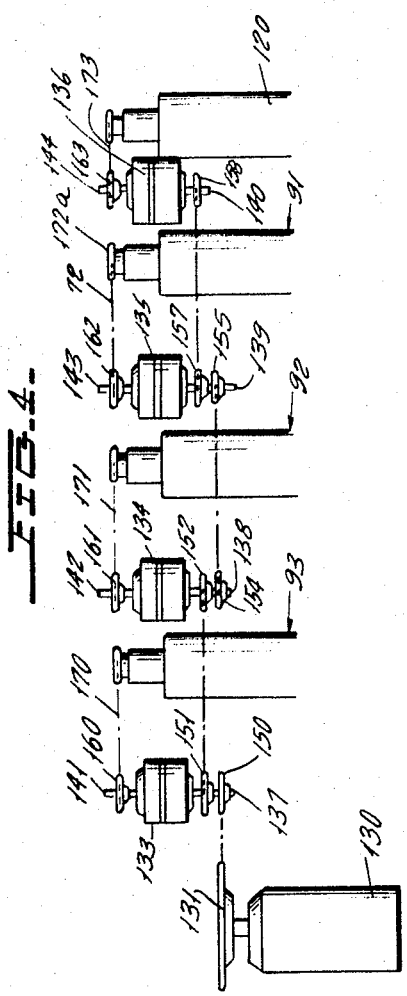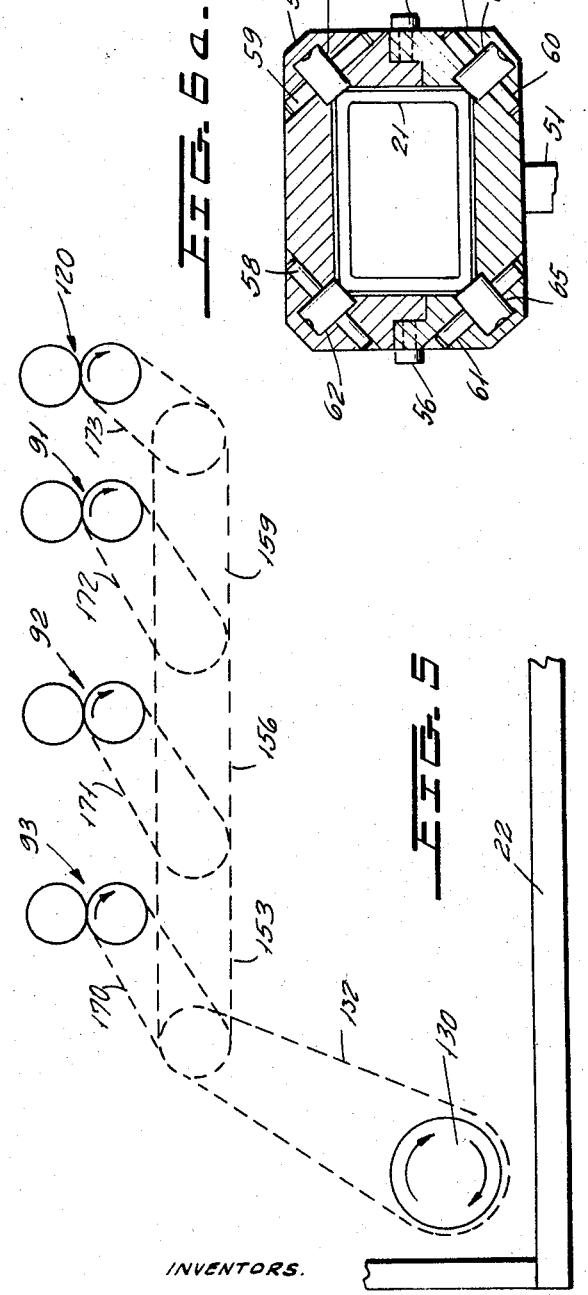

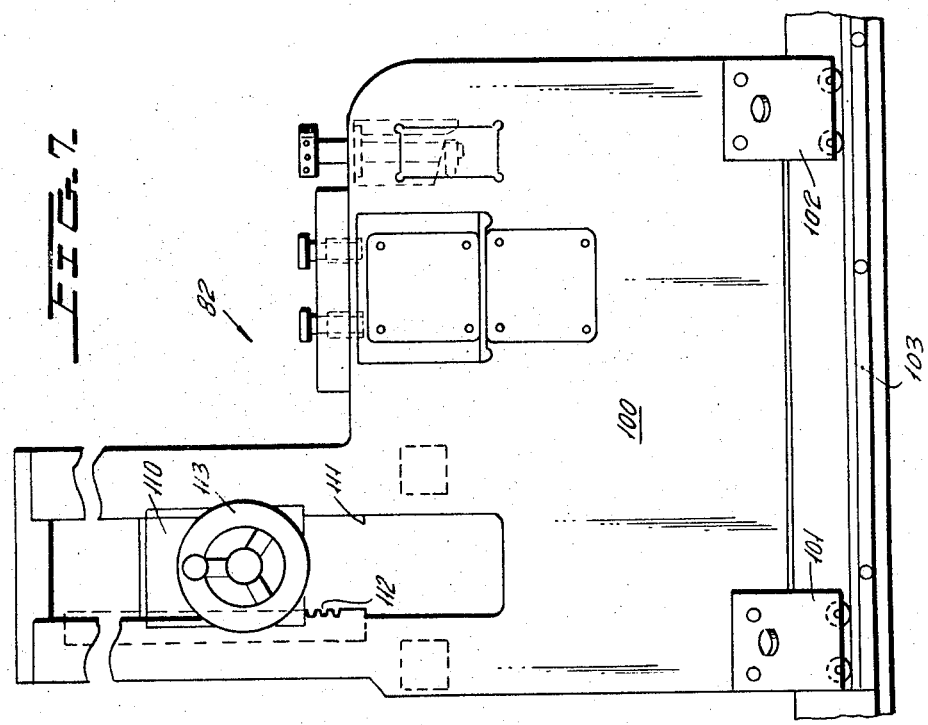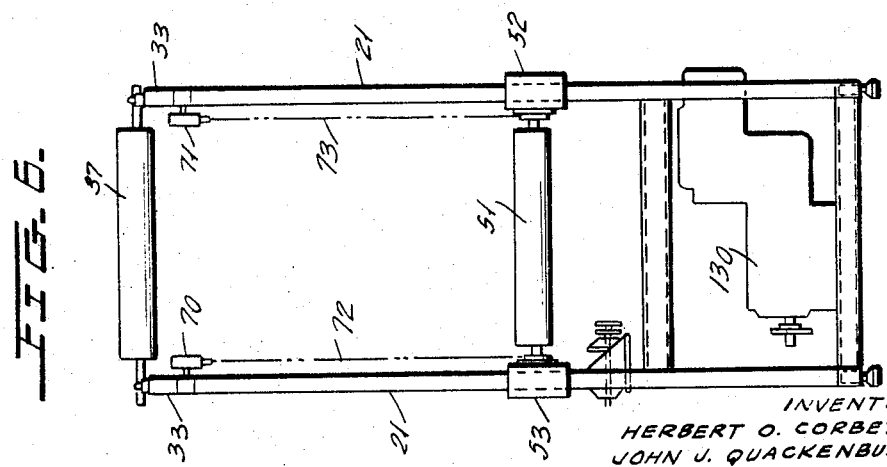

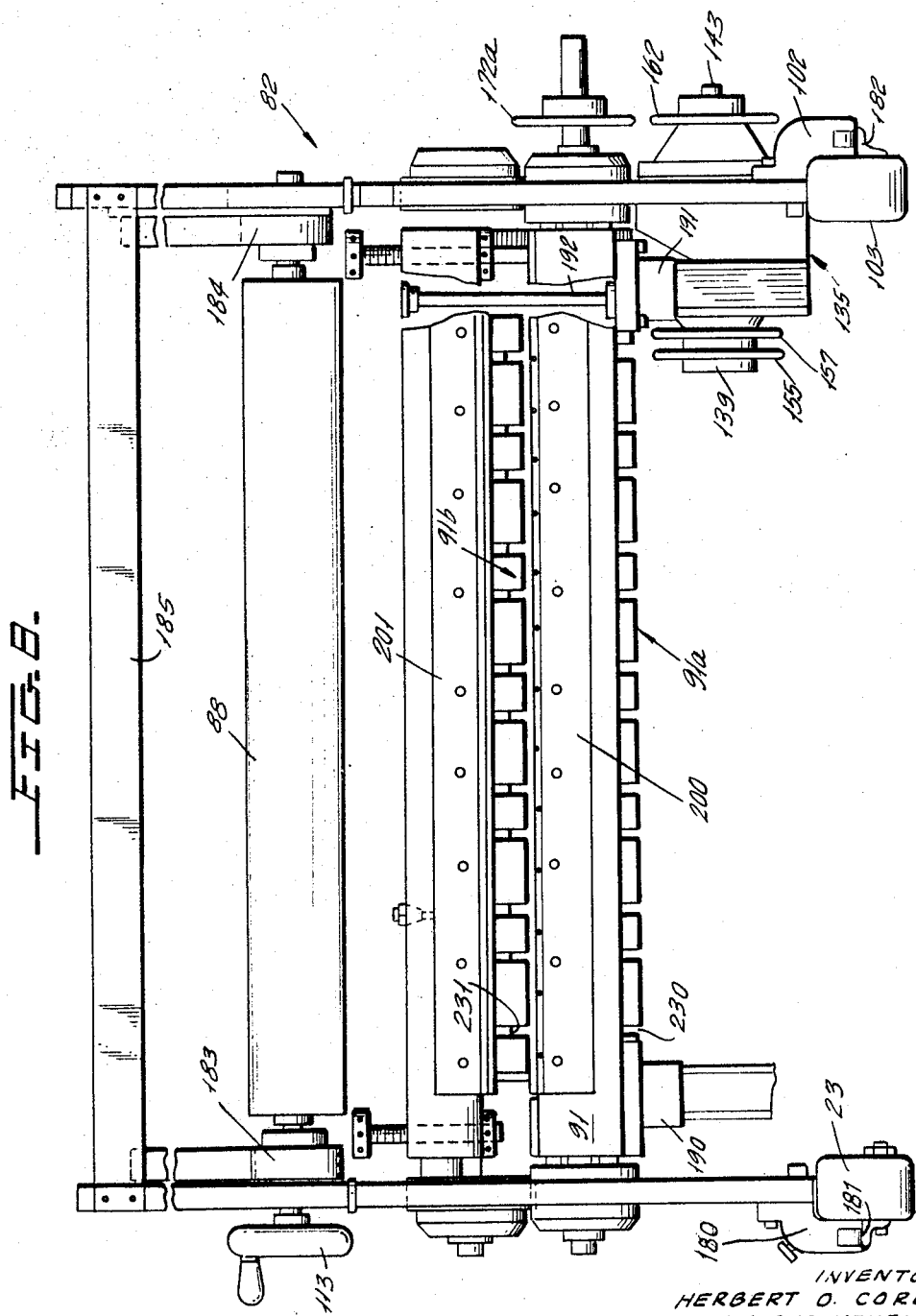

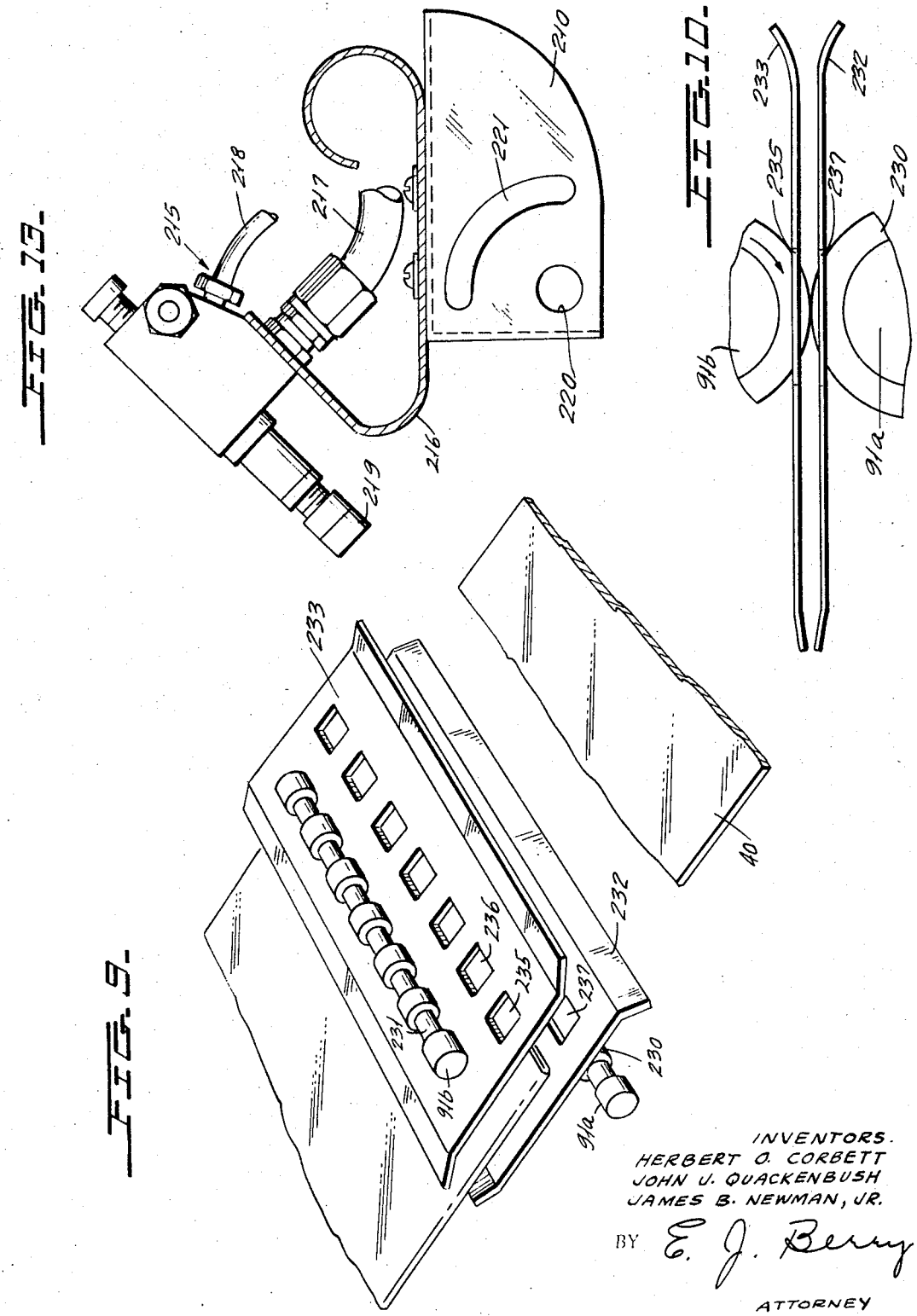

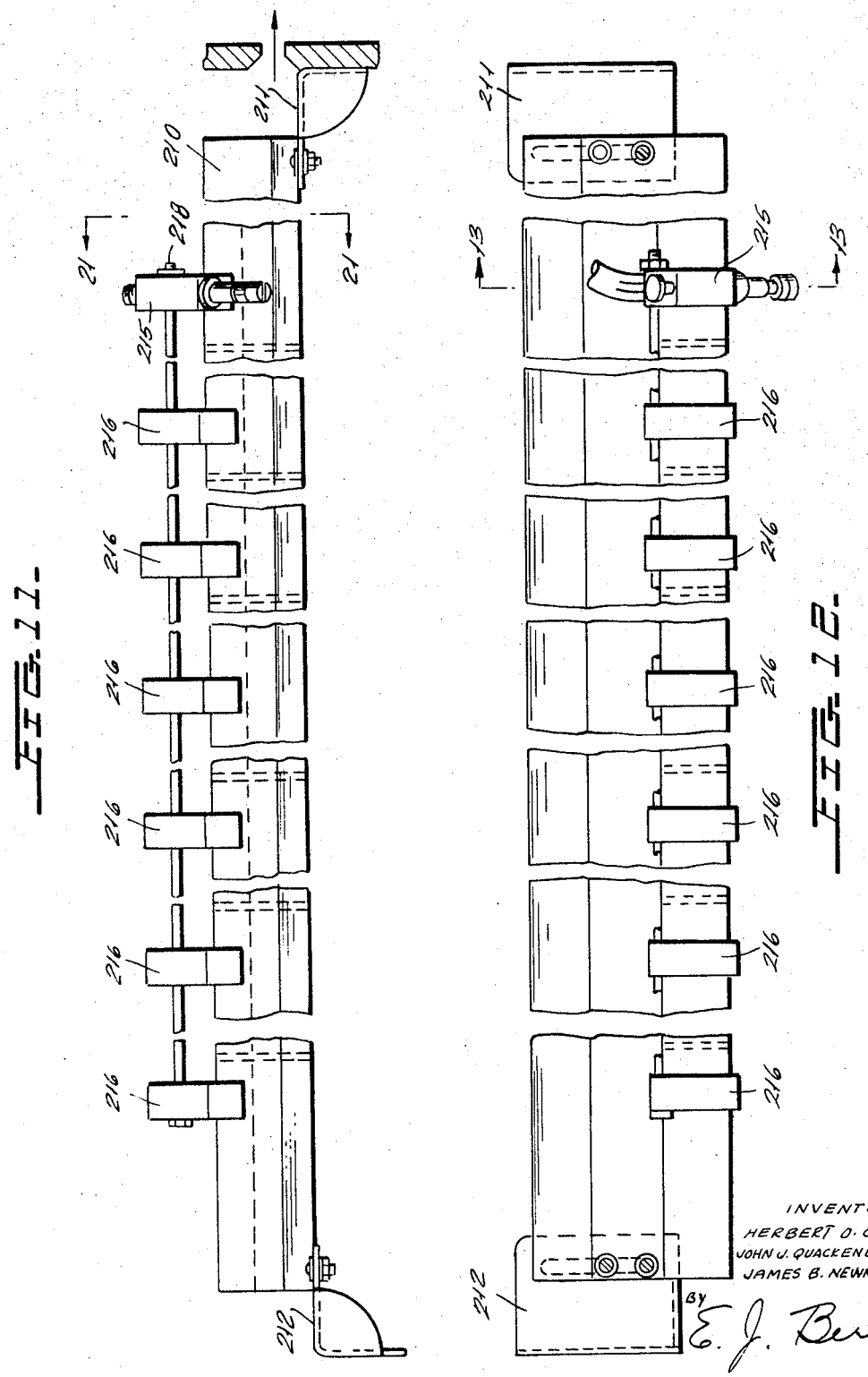

INVENTORS
HERBERT O. CORBETT
JOHN J. QUACKENBUSH
JAMES B. NEWMAN, JR.

BY E. J. Berry

ATTORNEY

INVENTORS
HERBERT O. CORBETT
JOHN J. QUACKENBUSH
JAMES B. NEWMAN, JR.
BY E. J. Berry
ATTORNEY

United States Patent Office 3,454,447
Patented July 8, 1969

3,454,447
BAG-MAKING MACHINERY
Herbert O. Corbett, Bridgeport, John J. Quackenbush, Monroe, and James B. Newman, Jr., Shelton, Conn., assignors to National Distillers and Chemical Corporation, New York, N.Y., a corporation of Virginia
Filed Aug. 5, 1964, Ser. No. 387,683
Int. Cl. B65h *25/24;* B32b *31/18*
U.S. Cl. 156—351                             8 Claims

ABSTRACT OF THE DISCLOSURE

A high speed plastic bag-making machine, which comprises a web storage means for storing a web length equivalent to a plurality of bag lengths; a plurality of transverse heat sealing stages, which are longitudinally spaced from one another and are simultaneously operable to form a plurality of spaced transverse seals in the web; and a single shearing stage which shears the sealed bags after the multiple sealing thereof.

---

This invention relates to bag-making machines, and more specifically relates to bag-making machines which convert tubular plastic stock into bags of predetermined length at high speed.

Bag-making machines are well known to the art, and include a sealing stage and shearing stage wherein a transverse seal is placed across a tubular web and the web is transversely sheared adjacent this seal to define the sealed end of one bag and the open end of the adjacent bag. Generally, where the tubular web stock is of the type known as "thick film," which is film having a thickness in excess of 3 mils, the sealing stage and shearing stage are separate from one another for reasons to be advanced later.

In the prior art type bag making machine, the rate of production is limited by the indexing mechanism used to position the web with respect to the sealing element and shearing mechanism. Typical indexing mechanisms are in the form of a rotary crank or an eccentric operated by an intermittent drive. When the web is initially positioned with respect to the sealing and shearing elements, these elements are actuated, and the indexing mechanism then goes through 360° of revolution before the next bag making cycle is reached. The length of time required to seal and shear in the prior art bag making operation is normally less than the time necessary for the indexing mechanism to recycle. Thus, the rate of bag manufacture has been limited to the highest speeds practically attainable by this type of indexing arrangement.

A further production rate limiting factor is the dwell or sealing time required to complete the transverse seal of the stock particularly where the stock has a thickness of the order of 5 to 10 mils. For example, on 5 mil thick tubular polyethylene material, the time necessary to form a good seal is of the order of 1½ seconds. As the stock becomes thicker, longer dwell times are necessary as, for example, for a 10 mil thick stock, 3½ seconds are needed to form a good seal. As a practical example of the production limiting effect of dwell time, 8 mil material requiring 2 seconds for a seal can be assumed to be used in a machine having an index time of 1 second. The total time lapsed to produce a bag will then be 3 seconds. Therefore, the maximum output rate of this machine would be 20 bags per minute.

The bag making machine of the present invention permits the manufacture of bags at a high rate of speed through the adoption of a new indexing concept for cycling the bag machine and through the use of tandem sealing stages which feed into a common shearing stage. The novel indexing mechanism of the invention employs a novel fully variable and continuous running tandem drive which is controlled either by a photosensing arrangement which monitors indexing marks on the film or by a lapsed time timer. Moreover, a plurality of tandemly arranged sealing stages are provided in combination with a single shearing stage. The input of the sealing portion of the machine includes a dancer assembly which, in the case of a machine having three tandemly arranged sealing stages, would store up enough material for three bag lengths. Once a sufficient amount of material is stored in the dancer assembly, this full length of material is moved into the tandem sealing stages. These tandem stages are adjustably spaced from one another to select suitable bag lengths and the sealing bar in each of the stages engages the web at its respective position to cause the sealing operation. Note that the dwell time required for accomplishing a plurality of tandem seals is equal to that previously required for the formation of a single seal. Thus, the speed of the machine can be tripled as compared to prior machines whose production is limited by the dwell time for a single seal.

The dancer bar assembly at the input of the machine is duplicated in the output of the machine wherein a novel counter-balancing structure using a constant tension spring arrangement provides a full counter-balanced dancer so that the amount of tension applied to the web can be closely controlled. Moreover, each of the sealing stations includes an adjustably positioned roller in combination with a clutch-brake drive system which permits the control of tension of the web from station to station in a novel and simplified manner.

In a particular arrangement, the bag-making machine can be provided with three sealing stations, each having its own respective sealing head. The sealing head may be pneumatically operated and each station may have its own set of draw rolls and a clutch-brake drive. The stations, which are identical to one another, are then suitably mounted in an appropriate side frame. Since three stations are provided, it will be possible to make bags three at a time, in varying lengths, depending upon distance between sealing heads.

In a typical embodiment, the bag length can be varied from 19 inches to 40 inches by moving the sealing stations horizontally to vary the distance between seal bars. If desired, any of the sealing heads in the different stations may be operated independently whereby it is possible to make two bags 60 inches long, for example, by switching off the central station and operating only the first and third stations. In a similar manner, if only one station operates, a longer bag can be made. Moreover, any of the single stations could operate separately so that any bag length can be made in the range, for example, of 10 inches to 120 inches. If desired, three different bag lengths could be made by using appropriate spacings between sealing stations.

In the example given above of the three station machine, it will be seen that a length of 120 inches of web must be stored in some manner. For this reason, a vertical dancer assembly is provided for the storage of this length of material where, for example, a single 4 inch diameter roll mounted between two vertical side columns is free to travel up or down in a vertical direction. As pointed out above, a novel counter-balanced arrangement is provided whereby the vertical movable roll is mechanically connected to constant tension springs which tend to pull the roll upwardly. This novel use of constant tension springs permits the adjustment of the tension on the web to suit web materials, web thickness and machine speed. Thus, the machine may be indexed at high rates of speed without the bounce usually associated with web accumulators of this type.

As mentioned above, each of the plurality of sealing stations has its own separate seal bar. As a further feature of this invention, each of these seal bars are associated with a plurality of sprays where a plurality of spray nozzles are arranged adjacent the seal bar and direct an extremely fine or atomized spray of a water and air mixture at the web seal. These nozzles are mounted immediately adjacent the leading edge of the seal bars and are directed at an angle and downwardly so that a mist of coolant reaches the end seal simultaneously with the opening of the seal bars. There is then a rapid evaporation of this fine mist when it comes into contact with the hot seal of the web to cause an extremely fast freeze of the seals and, thus, permits the immediate application of tension to the web to move the web through the index cycle without waiting an excessive time for the seal to freeze.

As previously discussed, the bag making apparatus of the present invention is divided into two main sections; a tandem sealing section arrangement and a common shearing section. In the manufacture of heavy duty plastic bags (having a gauge thickness in excess of 3 mils) it is difficult to simultaneously cut and seal since it is difficult to bring a separate cutting and sealing zone across the width of the stock. Furthermore, the sealing members or blades should provide a relatively large sealing area and have a substantial mass to provide a corresponding large seal area and to assure sufficient heat conduction to the seal. For these reasons, the present invention uses separate shearing and sealing zones. Thus, during continuous operation and after the plural sealing heads are simultaneously actuated, the continuous length of sealed tubing leaves the sealing area and enters a storage or accumulator area which includes a dancer assembly identical to the dancer at the input to the sealing stage. The output of this accumulator is a single shear assembly which is operated at a rate which is faster than the sealing rate by the number of sealing stages used. Thus, where three sealing stages are used, the single shear assembly will operate three times as fast as the sealing head to assure continuous and uninterrupted operation.

In order to operate a shear blade at this relatively high speed, a novel actuating mechanism has been developed for moving the shearing blade. More particularly, two air cylinders are connected at either end of the shear blade and are provided with a novel pneumatic connection from a common air source which is completely balanced and will control the shearing rate up to the order of three hundred strokes per minute. Moreover, the identically operated cylinders are further arranged so that the pistons within the cylinder do not fully bottom during each cycle. This results in a continuous smooth shearing action at the blade.

Accordingly, a primary object of this invention is to provide a high speed bag making machine.

A further object of this invention is to provide a novel bag making machine whose speed of operation is not restricted by the cycle time of the machine.

A further object of this invention is to provide a novel bag making machine in which inertia problems are reduced by employing a continuously running drive.

Still another object of this invention is to provide a novel bag-making machine which employs a plurality of tandemly arranged sealing sections.

Yet another object of this invention is to provide a novel high speed bag-making machine having an input dancer assembly for accumulating a plural number of bag lengths which are to be sealed simultaneously in tandemly arranged sealing stations.

Still another object of this invention is to provide a novel dancer assembly wherein a vertically movable dancer roll is counter-balanced by a constant tension spring.

Another object of this invention is to provide a novel sealing stage construction for tandemly arranged sealing stages which includes a vertically adjustable compensated roller for providing a vernier adjustment in the tension between stages.

Yet another object of this invention is to provide a novel brake and clutch arrangement for each stage of tandemly arranged sealing stages which permits the control of web tension between stations.

Another object of this invention is to provide a novel tandem sprocket drive which permits the use of common drive motor for a plurality of clutches of tandemly arranged operating stations.

A still further object of this invention is to provide a novel cooling arrangement using a water spray for cooling a seal across a thermoplastic web.

Another object of this invention is to provide a novel web guide arrangement for guiding a web through a pair of nip rolls which uses a notched plate as contrasted to the prior art use of a plurality of fingers.

Another important object of this invention is to provide a novel actuating mechanism for a shearing plate.

Yet another object of this invention is to provide a novel shear actuating mechanism using two simultaneously operated cylinders having pistons connected to each side of the plate.

Yet a further object of this invention is to provide a novel shearing apparatus which is fully automatic and has a high speed of operation with a variable speed range.

Yet another object of this invention is to provide a novel shearing apparatus using two identically constructed and identically pneumatically connected pistons which are adapted to instantaneously reverse prior to the time that the pistons bottom.

These and other objects of this invention will become apparent from the following description when taken in connection with the drawings, in which:

FIGURE 1 is a side view of the novel tandemly arranged sealing stations of the bag making machine of the present invention.

FIGURE 2 is a top view of a typical tubular web which will move through the bag making machine of FIGURE 1.

FIGURE 3 is a cross-sectional view of the bag of FIGURE 2 taken across the lines 3—3 of FIGURE 2.

FIGURE 4 illustrates a tandem drive clutch-brake structure connected to a common drive motor for operating the various stations of FIGURE 1.

FIGURE 5 illustrates a side view of the tandem chain drive arrangement of FIGURE 4.

FIGURE 6 is a side view of FIGURE 1 as seen from the left-hand side thereof.

FIGURE 6a is a cross-sectional view of the dancer roller carriage.

FIGURE 7 is a side plan view of one of the tandem sealing stages, and particularly illustrates the manner in which it is mounted on the main support rails.

FIGURE 8 is a front plan view of the sealing stage of FIGURE 7, and particularly illustrates the seal bars of the stage.

FIGURE 9 is a perspective view illustrating notched guide plates for the sealing unit.

FIGURE 10 is a side view of the plates of FIGURE 9.

FIGURE 11 illustrates the manner in which spray nozzles are mounted with respect to the seal bars.

FIGURE 12 is a top view of FIGURE 11.

FIGURE 13 is a cross-sectional view of FIGURE 12 taken across the lines 13—13 in FIGURE 12.

Figure 17:
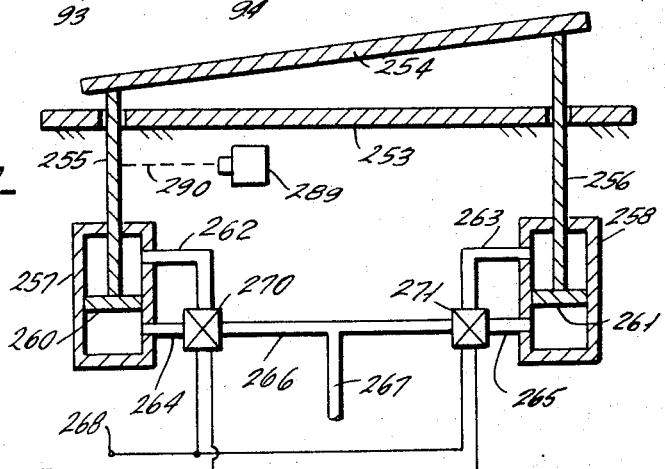

FIGURE 17 schematically illustrates the shearing section of the invention.

Figure 18:
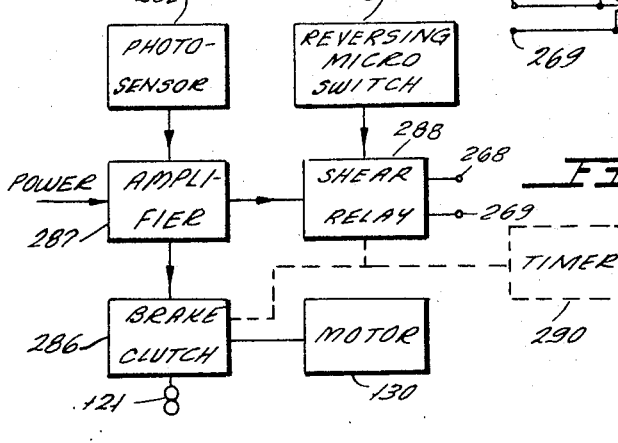

FIGURE 18 is a block diagram of the control circuitry for the shearing section of FIGURE 17.

Referring first to FIGURES 1 and 6, we have illustrated therein the novel bag-making machine of the invention, and more particularly the sealing stage of the machine. The sealing stage includes a suitable metallic frame which includes uprights 20 and 21 (FIGURES 1 and 6), and a central frame section which includes steel structural horizontal members 22 and 23 having vertical tie members 24, 25, 26 and 27. Each of uprights 20 and 21 have outwardly extending arms, such as arms 30–31 and 32–33. These outwardly extending arms serve to support rollers, such as rollers 34, 35, 36 and 37 (FIGURE 6).

It is to be specifically noted that the mechanical structural details for the support of these rollers would be well known to anyone skilled in the art. Moreover, appropriate means may be provided for adjusting the angular location of the axis of these rollers.

The input for the sealing stage of FIGURE 1 is to the right of the figure, and can include tubular plastic film wound on storage rolls or could be the output of a tubular film extruder. The tubular plastic film, which is operated upon by the sealing stage of FIGURE 1, is typically shown in FIGURES 2 and 3 as comprising a web 40 of tubular material which has been flattened. The flattened web, for example, can have a width of twenty-four inches, and is a relatively thick thermoplastic material which is sealable for production of bags and can, for example, have a thickness greater than 3 mils. The web material may also have printed material on the surface thereof and can include indicia, such as markings 41, 42 and 43 (FIGURE 2) spaced along the length thereof which will cooperate with a photocell, whereby a potosensitive circuit can determine the number of indicia moved therepast.

The apparatus of the present invention converts the continuous web of FIGURE 2 into bags having an open end and a sealed end, the bags being of some predetermined length. Thus, the sealing equipment is adapted to perform a seal across the width of the tube, while the shearing station later shears across the width of the web adjacent the sealed region. Thus, the sealed region serves as the bottom of a first bag, while the sheared section serves as the opening for an adjacent bag.

The path of the web material of FIGURES 2 and 3 through the machine of FIGURE 1 is schematically illustrated by the dot-dash line. Thus, the web 40 enters from some suitable input section over the roller 34. The web then moves downwardly to a vertically movable dancer 50 which is supported in the manner shown in FIGURE 6 for the dancer 51 at the output of the sealing stage. That is to say, each of dancers 50 and 51 are rotatable about their axis and are carried in suitable support members such as support members 52 and 53 of FIGURE 6. The supports 52 and 53 then enclose the side supports 21 of FIGURE 6.

The manner in which members 52a and 53 are constructed is best shown in FIGURES 6a which illustrates a typical support member as formed of two U-shaped cast members 54 and 55 which surround vertical support 21, and are secured together by suitable clamping screws 56 and 57. Each of cast members 54 and 55 then receive pins 58, 59, 60 and 61 which carry high strength rollers 62, 63, 64 and 65, respectively. The rollers 62 through 65 engage the corners of upright member 20 so that the supports 52 and 53 can roll with low friction along with upright 21.

As a further feature of the invention and in order to prevent the mass of the dancers, such as dancers 51 and 50, to exert too great a pressure on the web, a pair such as a pair of constant tension springs 70 and 71 are connected to the top of vertical members 21 (FIGURE 6), as well as members 20 of FIGURE 1. These springs are Neg'ator springs, which is a registered trademark of the American Machine and Metals, Inc. and are coiled springs having a constant tension regardless of the extension of the spring. These springs are then enclosed in the housings 70 and 71 which are fixed to the main support members, and have suitable connection cords 72 and 73 extending therefrom directly connected to carriages 53 and 52, respectively. It will be apparent that the upward force on dancers 50 and 51 may now be controlled by adjustment of the spring housings 70 and 71, whereupon any desired tension to be applied to the web may be applied thereto by adjustment of the spring housings.

Returning to FIGURE 1 and after the web passes under dancer 50, it moves upwardly and over roller 35, and then downwardly and under rolls 80 and 81. Thereafter, the web enters the sealing stations 82, 83 and 84 which are each adjustably carried on rail support 23, and which perform the tandem sealing operation of the invention. Each of the sealing stations 82, 83 and 84 are identical to one another, and generally include input rollers 85, 86 and 87, respectively, compensating rollers 88, 89 and 90, respectively, pairs of draw rolls 91, 92 and 93, respectively, and pairs of cooperating seal bars 94, 95 and 96, respectively.

A typical sealing station 82 is more completely shown in FIGURES 7 and 8 as including a frame support housing 100 which has suitable carriage wheels, such as carriage wheels 101 and 102, which ride on a rail 102 (behidn rail 23 in FIGURE 1). A suitable pair of wheels will engage rail 23 of FIGURE 1 whereby the entire station can be traversed along the length of the sealing assembling. Note that this means that the distance between seal bars 94, 95 and 96 may easily be adjusted depending upon the length of bag desired in the operation.

The compensating roller 88 of FIGURE 1 is then carried, as best shown in FIGURE 7, on a suitable adjustment block 110 which is vertically movable within the slot 111 in frame 100. One interior section of slot 108 has ratchet teeth 112 which receive a gear (not shown) carried by adjustment wheel 113. Thus, the height of roller 88 can be easily adjusted. This is an extremely important feature in permitting a vernier adjustment of the length of the bag to be produced and of the interstage tension on the web.

As will be shown more fully hereinafter, the top bar of seal bars 94, 95 and 96 are simultaneously operated to produce the seals for three bags in a tandem arrangement. The length of these bags will be the length of the web material between adjacent seal bears. This length is initially controlled by a physical positioning of sealing stages 82, 83 and 84. A finer control, however, is obtained by the subsequent adjustment of the height of rollers 88, 89 and 90 whereby very accurate control of bag length may be achieved.

After passing through sealing stages 82, 83 and 84, the web then passes through a pair of main draw rolls 120, over roller 36, under dancer 51, over roller 37, and then through a pair of draw rolls 121 which feed the sealed web from the dancer assembly, including dancer 51, into the shearing stage 122. The shearing stage 122 will be described in detail hereinafter.

The manner in which the various pairs of draw rolls are driven, and the novel motor driving system, is best understood from FIGURES 4 and 5. Referring to FIGURES 4 and 5, the power for moving the web through the shearing section comes from a single motor 130. That is to say, a novel tandem chain drive arrangement permits the use of a single common motor, rather than a plurality of separate motors for each of the draw rolls. Thus, in FIGURES 4 and 5, motor 130 has an output sprocket 131 which receives a chain 132. Each of the pairs of draw rolls 91 through 93 and 120 are then connected to identical clutch-brake arrangements 133, 134, 135 and 136, respectively (FIGURE 4). The clutch sections of these clutch-brake assemblies is at the bottom thereof in FIGURE 4, while the brake sections are at the top of the assemblies in FIGURE 4. The clutch-brake assemblies are of a common, commercially available type wherein an input shaft and output shaft are connectable through a suitable clutch. The output shaft, when disconnected from the input shaft by the clutch, is then automatically connected to a brake.

Thus, the input shafts 137 through 140 of each of the clutch-brake combinations may be driven under all conditions of braking and clutching. As indicated above, however, their corresponding output shafts 141 through 144, respectively, are connected either to a mechanical brake in the brake section, or are connected directly to input shafts 137 through 140, respectively. This change in connection can be effected by well known electro-mechanical arrangements. In particular, the clutch-brake combination of FIGURE 4 could be of the well known type manufactured by Warner Electric Corporation as their model 250–E brake-clutch combination.

Using this novel clutch-brake combination, applicant then connects the chain 132 to sprocket 150 on shaft 137. A second sprocket 151 of the shaft 150 is then connected to sprocket 152 on shaft 138 by chain 153. A second sprocket 154 on shaft 138 is then connected to sprocket 155 on shaft 139 by chain 156. A second sprocket 157 on shaft 139 is then connected to a single sprocket 158 on shaft 140 by chain 159. Clearly, the sprocket pairs 150–151, 152–154, and 155–157 are rigidly connected together through their respective shafts 137, 138 and 139. Therefore, the motor 130 will always drive input shafts 137 through 140.

The output shafts 141 through 144 of FIGURE 4 are then provided with sprockets 160, 161, 162 and 163, respectively, which are connected to the driving roller of draw rolls 93, 92, 91 and 120, respectively, by chains 170, 171, 172 and 173, respectively.

From the foregoing, it will now be apparent that the common motor 130 may be used to drive each of the draw rolls 91, 92, 93 and 120 even though there may not be simultaneous clutch operation for these various assemblies. Thus, the invention avoids the necessity for four separate motors with this novel arrangement while also altering an infinite number of adjustment steps for tension control.

FIGURE 8 shows a front view of sealing stage 82 of FIGURE 7, and particularly illustrates the manner in which rollers 102 and a similar roller structure 180 engage rails 103 and 23. Note that an auxiliary roller engaging surface 181 and 182 may be secured to rails 23 and 103, respectively, for receiving the roller structure.

FIGURE 8 additionally illustrates the draw roll assembly 91 particularly for the driven roll of the assembly which is connected to sprocket 172a (FIGURE 4). Sprocket 172a is located adjacent sprocket 162 for connection between the two by a chain (not shown). The sprocket 162 is then seen as carried on the shaft 143 of brake-clutch combination 135.

FIGURE 8 further illustrates the two sprockets 155 and 157 which are carried on input shaft 139 of the clutch-brake assembly. The manner in which the seal bars are arranged within each of the sealing assemblies is best seen in FIGURES 8, 9, 10, 11 and 12.

In general and as shown in FIGURE 8, two opposing seal bars 200 and 201 are movable into engagement with one another. More particularly, two operating pistons 190 and 191 have extending piston rods such as piston rod 192 of piston 191 which extend through suitable openings in stationary seal bar 200 and terminate on movable seal bar 201. A suitable hydraulic operating structure causes vertical movement of the piston rods, such as rod 192, to move the seal bar 201 into and out of sealing relation with bar 200. These seal bars are each heated to a suitable temperature by conventional means, the seal bar 200 being stationary, and the seal bar 201 being vertically movable toward engagement with seal bar 200. Any suitable mechanism (not shown) is connected to seal bar 201 to move it downwardly when a sealing operation is desired. Pneumatic operating systems are often used for this purpose, and can be used in the case of the present invention in the standard manner.

As a further feature of the invention and in order to provide rapid freezing of the sealed area, a plurality of water spray nozzles extend along the length of the seal bar and are arranged to apply a spray of water to the seal immediately after the seal is formed, thereby cooling the seal by rapid evaporation of water droplets which fall on the seal. This arrangement is best shown in FIGURES 11, 12 and 13 wherein a support member 210, secured to adjustable brackets 211 and 222, receives a plurality of water spray nozzles, such as nozzle 215. Six other similar nozzle arrangements are connected to brackets 216, whereby a water spray is applied across the length of the seal.

As best shown in FIGURE 13, a typical water spray nozzle 215 is carried on bracket 216, and receives a high pressure air conduit 217 and a water conduit 218. A spray is then produced in the usual manner through the spray nozzle 219. It will be noted that the brackets, such as bracket 210, are mounted on a fixed shaft extending through opening 220, and is angularly rotatable about a second pin extending through slot 221 which can be locked in any desired slot position. Thus, the angle at which spray units 215 are aimed at the seal can be easily adjusted.

As a still further feature of the invention, the web is guided into the seal bars in a novel manner. More particularly and as best shown in FIGURES 8, 9 and 10, the draw roll assembly 91 is formed of opposing draw rolls 91a and 91b. Each of these draw rolls is provided with undercut sections along the length thereof, such as undercut sections 230 and 231 in rolls 91a and 91b. A pair of guide plates 232 and 233 are then provided to pass the web between rolls 91a and 91b (FIGURES 9 and 10) wherein plates 232 and 233 are provided with a plurality of openings, such as openings 235, 236 and 237 in FIGURE 9. The undercut portions, which include portions 230 and 231 in draw rolls 91a and 91b, are then arranged to span the material between the adjacent openings, such as openings 235 and 236 in plate 233, whereupon the large diameter portions of the draw rolls pass through cooperating apertures and guide plates 232 and 233 to accomplish the surface to surface contact shown in FIGURE 10. Thus, a novel manner for guiding and driving the web is provided in each of the sealing stages of the invention.

Before turning to the operation of the sealing section, the electrical control for the movement of the web should be understood. The manner in which the feed of the web through the sealing portion of the novel bag-making machine is accomplished is as follows:

An upper and lower microswitch 240 and 241, respectively, are suitably mounted to be engaged by dancing roller 50 when it has moved to some upper or lower limiting position, respectively. A normally open gating swtich 242 is then arranged adjacent dancer roller 50 in any suitable manner whereby the switch is closed when roller 50 moves upwardly and passes the switch position. That is, switch 242 has a suitable operating member (not shown) which is engaged and operated by roller 50 as roller 50 moves upwardly and past switch 242. The normally open switch 242 is more particularly mounted on a suitable vertical support (not shown) so that it may be vertically adjustably positioned. Thus, for the switch 242 to be operated from its normally open position to its closed position, a predetermined length of web material must be withdrawn from the dancer, this length of material being equal to the distance from the switch position 242 to the lowest position that roller 50 will assume.

In particular, this distance is caused to be greater than the length of two bag lengths, but less than the length of three bag lengths for reasons which will become apparent hereinafter.

A photosensing means 243 is then arranged, as indicated in FIGURE 1, in such a manner that it will be in registry with the index markings, such as markings 41, 42 and 43 of the web 40. As will be seen more fully hereinafter, the gating switch 242 serves to hold photosensor 243 inoperative during the passage of the first two bag length markings, such as markings 41 and 42 and, prior to the time that the third marking passes photosensor 243, the gating switch 242 is closed to render the photosensing means 243 operative before the third index marking passes thereby. By way of example, the gating switch 242 can be simply arranged to control the light source (not shown) associated with photosensor 243 by turning this source on only when switch 242 is closed.

Figure 16:
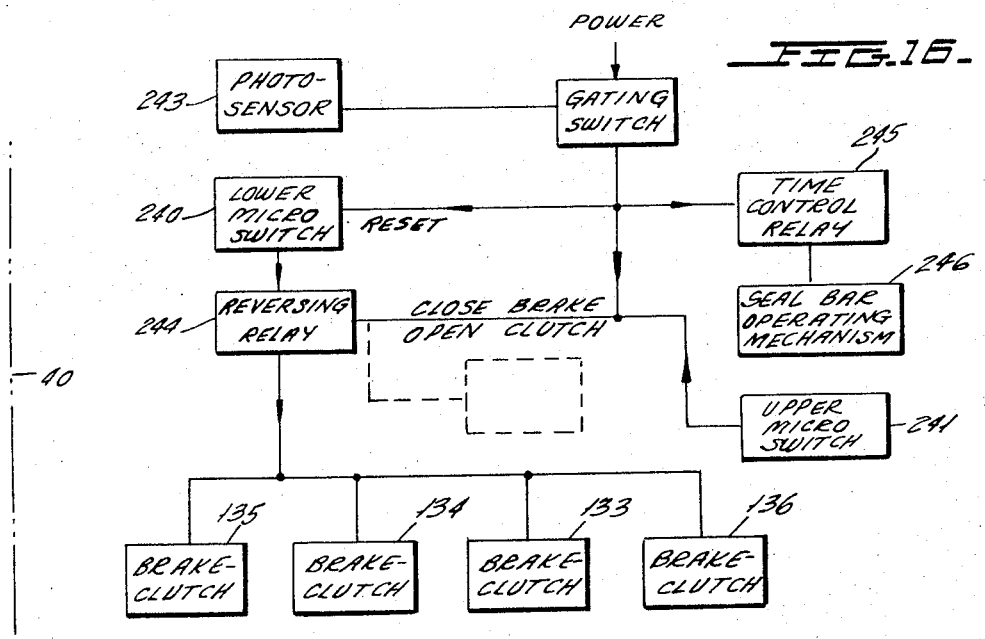
FIGURE 16 is a block diagram of the control circuitry for the sealing section of the invention.

The arrangement of the various components, above described in FIGURE 1, are schematically illustrated in FIGURE 16. The operation of the sealing section is best understood by reference to FIGURE 16 in conjunction with FIGURE 1. Assume first that the dancer roller 50 is positioned above switch 242, which is open, and that material is being accumulated in the dancer assembly with the roller 50 descending. At that time the brakes of the brake-clutch combinations 133 through 136 are engaged while their respective clutches are open. Thus, web material does not pass through the sealing stage at this time. Once the roller 50 engages the lower microswitch 240, the lower microswitch 240 operates a suitable relay 244 which connects an operating signal to clutch-brake assemblies 133 through 136 which closes the clutch sections and opens the brake sections. This causes the movement of web material through stages 82, 83 and 84, thus causing the roller 50 of the dancer assembly to rise.

As pointed out above, it is desired to pass three bag lengths through the sealing assembly before the brakes are applied and the clutches are opened, and the seal bars are operated. In order to accurately locate or measure the passage of exactly three bag lengths, the normally open gating switch 242 renders photosensor 243 inoperative as the first and second index markings on the web 40 pass below photosensor 242. This is accomplished by adjustably locating gating switch 242 at a distance above the lowest position of dancer 50 (at which it operates switch 242) which distance is greater than two bag lengths (and thus the passage of two index markings), but less than the length of three bag lengths. Once the roller 50 reaches the position of gating switch 242, it closes the gating switch so that the photosensor 243 is now rendered operative. Thus, as the third index marking passes photosensor 243, an output signal is developed by photosensor 243 indicating that three bag lengths have now passed into the sealing stage. The signal generated by photosensor 243 may then be applied through the gating switch 242 or in any other suitable manner and through a normally closed time control relay 245, to the reversing relay 244. Relay 244 then switches the mode of operation of brake-clutch assemblies 133 through 136 to close the brakes and open the clutches. At the same time, a signal is applied to the seal bar operating mechanism 246 which causes the seal bars of the individual stages 82, 83 and 84 to close.

The time control relay 245 controls the length of time that the seal bars remain closed, and is set for some predetermined dwell time required by the material being sealed. After this dwell time elapses, the time control relay 245 opens, thus removing the operating signal from the seal bar operating mechanism. At the same time, the signal passing through gating switch 242 resets lower microswitch 240 to its normally open position. Thus, the system now sits in a condition with the brakes closed and clutches open for the brake-clutch combinations 133 through 136 awaiting the loading of the dancer assembly and the reclosing of the lower microswitch 240 by engagement with roller 50.

The upper microswitch 241 is provided to prevent stages 82, 83 and 84 from attempting to draw material therethrough when an insufficient amount of material has been stored in the dancer assembly. Thus, if roller 50 ever reaches the top of the dancer assembly and engages upper microswitch 241, the reversing relay 244 is immediately operated to the close-brake open-clutch position.

While the foregoing description is for the automatic length measurement mode of operation, it will be apparent that a simple timing arrangement could be utilized. Thus, a timer mechanism 250 can be directly connected to the close-brake open-clutch terminal of reversing relay 244 while only the lower microswitch 240 is connected to the close-clutch open-brake input terminal of relay 244. In this mode of operation, it will also be apparent that the timer 250 will be used to reset the lower microswitch 240 after the timer indicates that the required web length has been loaded into the sealing stages.

It is believed clear that the novel sealing section of the bag making machine can substantially increase its speed of operation over that of the standard machine having a single sealing stage in that three seals or any other desired number, depending upon the number of sealing stages, can be formed simultaneously. Thus, the previously limiting "dwell time" required for the formation of the seal is now distributed over three seals so that the operation of the machine is inherently faster. Moreover, the novel indexing mechanism of the invention permits the continuous flow of web material into the input dancer 50 so that the device is not limited in its speed of operation by the cycling time of the indexing mechanism.

As pointed out above, after the tandemly sealed web portions are removed from the sealing section of the machine, they are applied to a shearing stage 122. It is well known that shearing stages can be operated at a higher rate of speed than the sealing stage so that a shear is provided which operates at a rate three times faster than the indexing mechanism for the sealing section of FIGURE 1. To this end, the output sealed web from draw rolls 120 are accumulated by the dancer 51, while the draw rolls 121 move the sealed sections through the shear 122 one bag length at a time.

Turning next to the shearing section of the invention and as described above, the shearing section will operate at three times the speed of the sealing system. In order to achieve this high velocity shearing, a novel shearing structure has been produced, as best shown in FIGURES 14, 15, 17 and 18.

Figure 15:
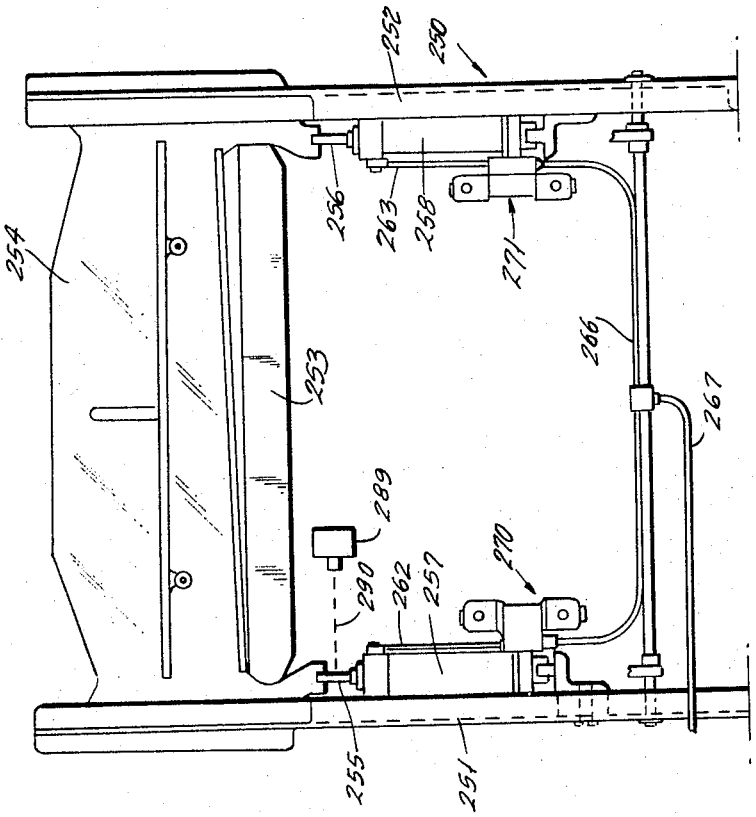
FIGURE 15 is a side view of FIGURE 14, and particularly illustrates the manner in which two support cylinders are connected to respective ends of the shearing plate and are connected to a suitable pressure source through an identical pneumatic system.
Figure 14:
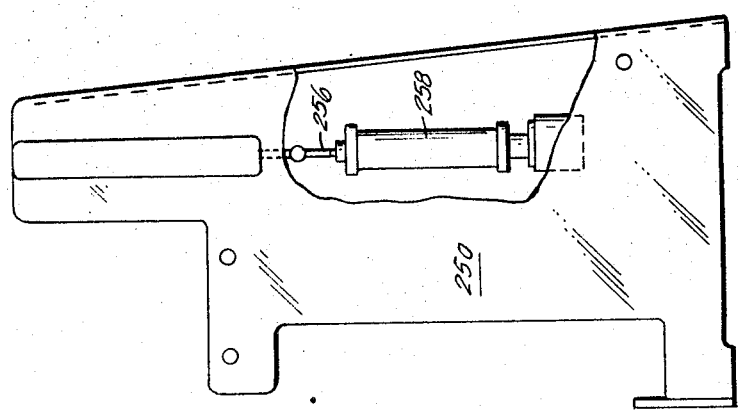
FIGURE 14 is a side view partially broken away of the shearing station of the present invention.

Referring first to FIGURES 14 and 15, the shearing structure (122 of FIGURE 1) is comprised of a sturdy cast base section 250 which includes upright members 251 and 252 (FIGURE 15). A fixed shearing plate 253 is rigidly secured to legs 251 and 252 while a movable shearing plate 254 is carried in a suitably guided manner on legs 251 and 252. The movable shearing section 253 is then fixed to piston rods 255 and 256 extending from cylinder housings 257 and 258. The piston rods 255 and 256, as best shown in FIGURE 17, terminate in pistons 260 and 261. Each of pistons 260 and 261 and cylinders 257 and 258 are identical in construction, and are moved under the influence of high pressure air or fluid above pistons 260 and 261, through conduits 262 and 263, respectively, or below by conduits 264 and 265 (FIGURE 17), respectively. Identical two-way valves 270 and 271, which may be electrically operated devices for electrically controlling the valve position, are then connected to conduits 262–264 and 263–265, respectively. A common input conduit 266, having a centrally located supply line 267, is then connected to valves 270 and 271, it being specifically noted that the pneumatic operating system is completely symmetric. That is to say, the length of the input conduits section 266 from conduit 267 are identical and have identical configurations. The valve 270 and 271, as best shown in FIGURE 17, are then controlled by the application of a voltage to terminals 268 and 269. This completely symmetrical arrangement has been found to be of great importance in causing simultaneous operation of pistons 260 and 261.

It has been found that the novel shearing structure of

FIGURES 14, 15 and 17 is of great utility in any general shearing operation in that it can operate at great speed. In general, when it is desired to cause a shearing operation, an electrical signal is applied to valves 270 and 271 to cause the application of high pressure to conduits 262 and 263. At the same time, conduits 264 and 265 are vented to open air in any appropriate manner through the valves 270 and 271. This causes a downward motion of blade 254 which passes immediately adjacent stationary blade 253 to cause the shearing operation. A conventional electrical circuit, then deenergizes the solenoid of valves 270 and 271 prior to the time that pistons 260 and 261 have reached bottom in cylinders 257 and 258. More particularly, the circuit is deenergized after the pistons 260 and 261 have gone to 90% of their total possible travel in cylinders 257 and 258, respectively.

With the deenergizing of the solenoids of valves 270 and 271 are operated to apply pressure to conduits 264 and 265 and to vent conduits 262 and 263. Thus, a high pressure is built up beneath the descending pistons 260 and 261 to cause rapid reversal of the piston movement, and to supply a smooth cushioning prior to the upward movement of pistons 260 and 261, and thus the upward movement of movable blade 254.

It should be specifically noted that this novel reversal of piston force, prior to the time that the pistons bottom is of great importance in achieving a high speed shearing operation. Moreover, the symmetry of the pneumatic connections to the two pistons 260 and 261 is instrumental in causing simultaneous operation of pistons 260 and 261. That is to say, where an unsymmetric connection is used, it has been found that only one of the pistons will operate quickly, while the other will lag the operating piston, thus leading to an inoperable or inefficient shear system.

The manner in which the shear structure is controlled in the bag making apparatus of the present invention is best understood from FIGURE 18.

Reference now to FIGURE 18, there is illustrated therein the draw rolls 121 (FIGURE 1) which move the sealed web into the shear structure 122. As shown in FIGURE 1, a lower microswitch 280 is provided for cooperating with dancer roller 51 and serves to apply the brake of the brake-clutch combination associated with the shear drive mechanism to prevent the excessive accumulation of material in the dancer assembly. An upper microswitch 281 is also provided which causes the application of the blade when this switch is closed, indicating an insufficient amount of stored web in the dancer assembly.

As best shown in FIGURES 1 and 18, a photosensor device 282 is provided to scan the web index markings as the web is withdrawn from the dancer assembly. The drive motor 130 for the shear assembly is then connected to a brake-clutch assembly 286 which is similar to the brake-clutch assemblies 133 through 136 in the sealing section. The brake-clutch assembly 286 is then connected to drive draw rolls 121, as schematically indicated in FIGURE 18.

In the normal operating mode, the brake of the brake-clutch assembly 286 is released and the clutch is engaged so that there is a normal drive connection from motor 130 to draw rolls 121. However, the brake-clutch assembly 286 is operated to a reversed condition with the brake closed and the clutch released each time photosensor 282 senses an index marking on the web. Thus, as shown in FIGURE 18, a photosensor 282 is connected to amplifier 287 and the output of amplifier 287 is connected to the input of the brake-clutch assembly 286. Amplifier 287 is further connected to a shear operating relay 288 which has output terminals 268 and 269 described above with reference to FIGURE 17.

A reversing microswitch 289 is also connected to shear relay 288 and operates to reverse the signal at leads 268 and 269 after the movable shear blade 255 has moved a predetermined distance and the pistons 260 and 261 of FIGURE 17 have reached a predetermined depth in their respective cylinders 257 and 258. The reversing microswitch 259 is schematically illustrated in FIGURES 15 and 17 as being operatively connected to piston rod 255 by the dotted line 290. Thus, when the blade 254 descends to a predetermined position, it will engage the operating member of switch 289 so that the potential at leads 268 and 269 reverses to reverse the direction of motion of pistons 260 and 261 with positive action before they reach bottom in their respective cylinders.

The operation of the shearing assembly is believed to be apparent from the foregoing. Thus, the motor 130 normally drives draw rolls 121 to pull the web continuously during the shearing stage. This action, however, is interrupted each time a full bag length passes through the shearing apparatus as measured by the index markings on the web adjacent photosensor 282. Once such an index marking falls under photosensor 282, a signal is generated and amplified in amplifier 287. This signal is then applied to the input of the brake-clutch assembly 286 to apply the brake and release the clutch, thus momentarily stopping web. At the same time, a signal is applied to the shear relay 288 to cause the shear to operate while the web is held stationary by the brake-clutch assembly 286. The reversing microswitch 289 then measures the motion of the shear and automatically causes the shear to reverse in operation before the operating pistons reach bottom. After the shearing operation is completed, the brake-clutch assembly 286 is then returned to its normal condition so that the motor 130 drives draw rolls 121 to move the web to its next shearing position, as measured by photosensor 282.

It will readily be apparent that the above noted automatic operation of the system could be replaced by a timing mechanism, such as the timing mechanism 290, shown in dotted lines in FIGURE 18, and which applies a suitable timed signal to the input of the brake-clutch assembly 286 and to the shear relay 288.

In order to control relay 286, the lower microswitch 280 is connected in suitable circuit arrangement therewith so that when the lower microswitch 280 is operated by engagement of dancer 51, the relay 287 is operated to a brake release and clutch connection position. This permits the motor 285 to drive draw rolls 121. Once the web stored in the dancer assembly and roller 51 engages switch 281, the upper microswitch 281 operates relay 287 to a brake engaged and clutch release position, whereupon the draw rolls 181 are stopped, while the sealing mechanism operates to cause the sealing operation and reload the dancer assembly including roller 51. In order to achieve suitable shearing operation, the photoscanner 282 visually scans the index markings on the web passing out of the dancer assembly storage region and into shear 122. Thus, as schematically illustrated in FIGURE 18 and through the use of suitable circuitry, when the photosensing device 282 observes an index marking, or in some predetermined time relation to the observation of an index marking, the photosensing device output passes through microswitch 280 to relay 287 to momentarily open relay 287, and to momentarily apply the brake and disengage the clutch of assembly 286 and stop draw rolls 121. Simultaneously, the photosensing device 282 operates a suitable pulse output circuit 290 so that power is applied from a suitable power source to the terminals 268 and 269 (FIGURE 17). Therefore, an operating voltage is applied to valves 270 and 271 of FIGURE 17 which causes the forceful downward motion of pistons 260 and 261 to cause the shearing operation while the brake is applied to draw rolls 121 and the web is stationary.

Although this invention has been described with respect to preferred embodiments thereof it should be understood that many variations and modifications will now be obvious to those skilled in the art, and it is preferred there-

What is claimed is:

1. A bag-making apparatus for producing bags from a continuous web of tubular material, said apparatus including storage means for storing said web; sealing apparatus including a plurality of selectively adjustable sealing stages disposed transversely of the path of movement of said web through said apparatus; means for intermittently moving a predetermined length of said web from said storage means and through said sealing stages, each of said sealing stages including a pair of heated sealing bars extending transversely of said web and positioned on opposite sides thereof; means for simultaneously operating said pairs of sealing bars from an open position to a closed position to produce a plurality of spaced transverse seals across said web, said predetermined length of web being of greater length than the distance between the sealing bars of the first and last sealing stages; a second storage means, said second storage means following said sealing bars and adapted for storing at least said predetermined length of web after it has passed through the sealing apparatus; shearing apparatus including blade means for shearing said web transversely adjacent each transverse seal; operating means for moving said blade from an open to a shearing position; a second intermittent moving means for successively moving a length of said web identical to the distance between adjacent transverse seals in the web from said output storage means to the blade of said shearing apparatus, the intermittent speed of operation of said shearing blade being greater than the intermittent speed of said sealing apparatus by a factor identical to the number of sealing stages and means coordinating said shearing means with said sealing means and said two intermittent moving means.

2. The sealing apparatus substantially as set forth in claim 1 wherein each of said sealing stage includes a respective vertically adjustable roller for receiving said web to adjustably change the length of said web between the said seal bars of adjacent sealing stages.

3. The apparatus substantially as set forth in claim 1 which includes coolant spray means disposed adjacent each of said pairs of seal bars for directing a sprayed coolant toward the seals formed by said seal bars.

4. The combination substantially as set forth in claim 1 which includes a first and second piston, a respective first and second cylinder receiving said first and second piston and a pneumatic operating means connected to said first and second cylinders for defining said shear operating means; said first and second pistons being connected to first and second portions of said blade; and a first and second valve means for selectively connecting said pneumatic operating means to said first and second cylinders; said first and second valve means including first conduit means to connect a high pressure fluid above said first and second pistons, respectively, and third and fourth conduit means for connecting a high pressure fluid below said first and second pistons, respectively; said first and second conduits and said third and fourth conduits having identical hydraulic characteristics.

5. The combination substantially as set forth in claim 4 wherein said first and second valve means connect said third and fourth conduit means to said high pressure source before said first and second pistons reach their bottom-most limit of travel in said first and second cylinders, respectively.

6. The sealing apparatus substantially as set forth in claim 1 which includes a pair of draw rolls supported in each of said sealing stages; said pairs of draw rolls defining at least a portion of said intermittent moving means.

7. The apparatus substantially as set forth in claim 6 which includes a respective clutch-brake combination for each of said pairs of draw rolls; each of said clutch-brake combinations having an input shaft, an output shaft and an operating structure; said operating structure being operable to connect and disconnect said input shaft and output shaft while respectively releasing and restraining rotation of said output shaft; said output shaft of each of said clutch-brake combinations being connected to said respective draw rolls; and a motor driving means connected to said input shaft of said respective clutch-brake combinations.

8. The apparatus substantially as set forth in claim 7 wherein said motor driving means includes a common drive motor; said input shafts of said clutch-brake combinations each having first and second sprocket means connected thereto; a first chain for connecting said drive motor to the said first sprocket of a first of said input shafts; a second chain for connecting the said second sprocket of said first drive shaft to the first sprocket of a second of said shafts; and a third chain for connecting the said second sprocket of said second input shaft to the said first sprocket of a third of said input shafts.

References Cited

UNITED STATES PATENTS

| | | | |
|---|---|---|---|
| 1,653,356 | 12/1927 | Freeman et al. | 156—549 XR |
| 2,729,270 | 1/1956 | Prenveille et al. | 156—583 |
| 2,749,817 | 6/1956 | Piazze et al. | 156—583 XR |
| 3,043,729 | 7/1952 | Seiden | 156—553 XR |
| 3,050,916 | 8/1962 | Gausman et al. | 156—311 |

FOREIGN PATENTS 908,579  10/1962  Great Britain.

OTHER REFERENCES

Pippenger, J., and Hicks, T.: Industrial Hydraulics, McGraw-Hill, New York (1962), page 343 relied on.

EARL M. BERGERT, *Primary Examiner.*

W. E. HOAG, *Assistant Examiner.*

U.S. Cl. X.R.

156—353, 358, 361, 366, 495, 498, 510, 583